Sept. 20, 1960  W. W. LYSAK  2,953,330
LOAD STABILIZER
Filed March 17, 1958  2 Sheets-Sheet 1
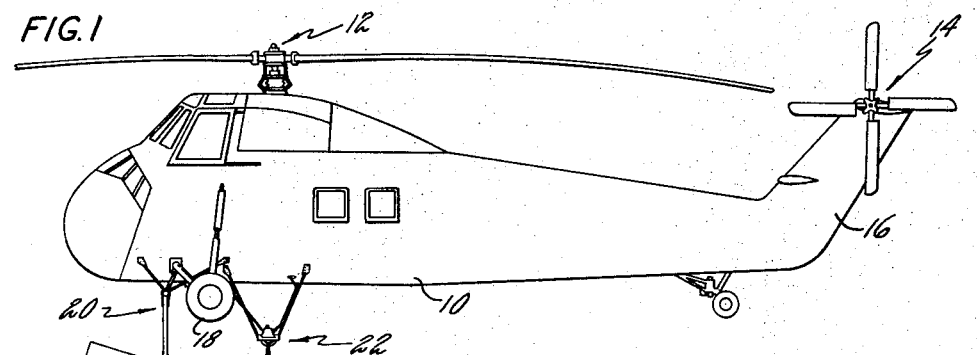
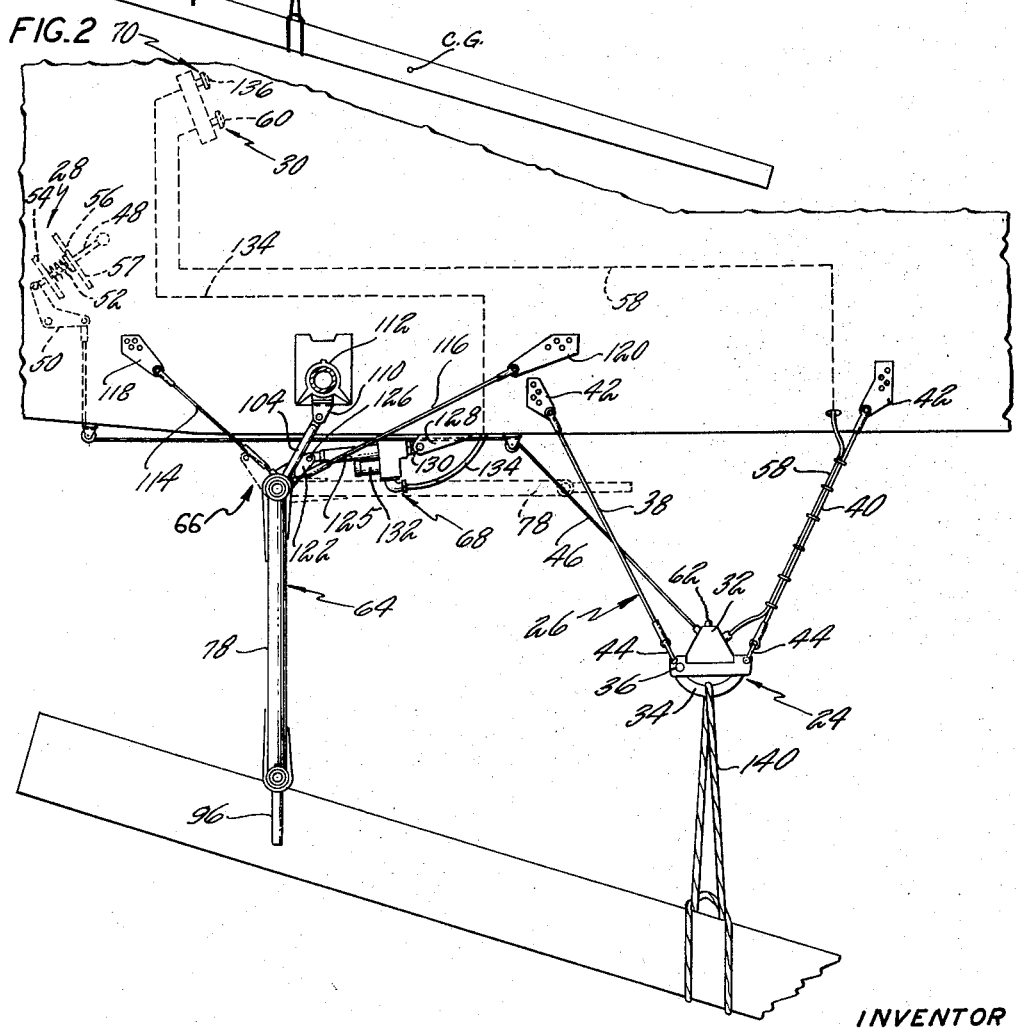
INVENTOR
WALTER W. LYSAK
BY Jack N. McCarthy
AGENT

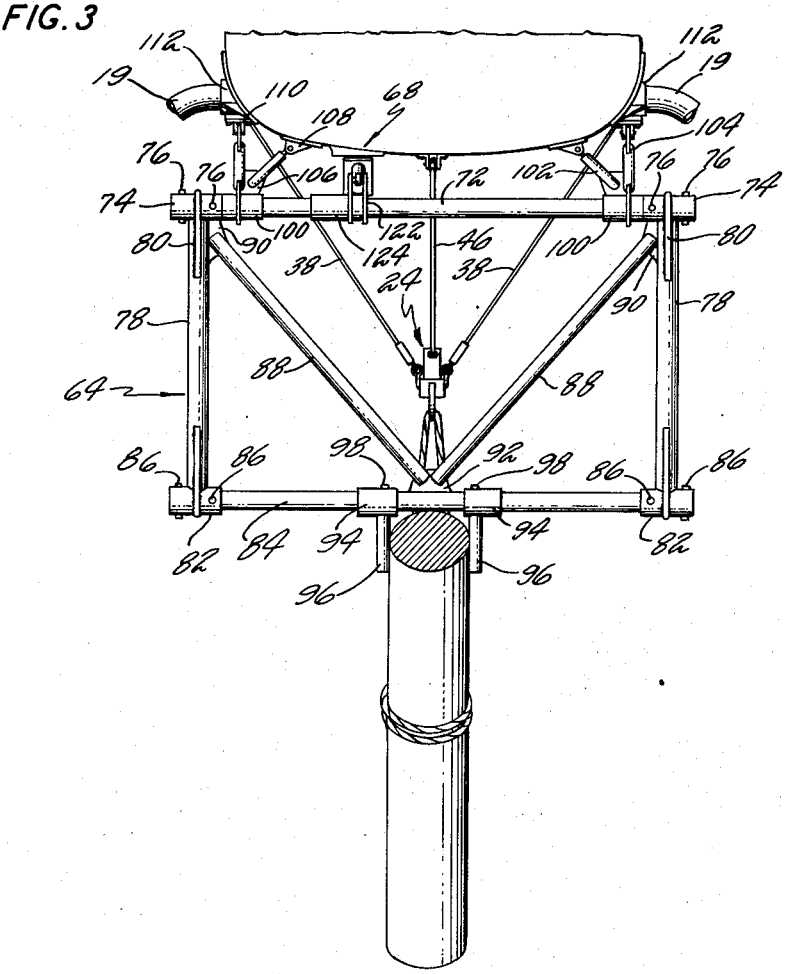

2,953,330

LOAD STABILIZER

Walter W. Lysak, Trumbull, Conn., assignor to United Aircraft Corporation, East Hartford, Conn., a corporation of Delaware Filed Mar. 17, 1958, Ser. No. 721,721

9 Claims. (Cl. 244—118)

This invention relates to means for stabilizing loads being lifted, carried, or lowered by aircraft, especially helicopters.

It is an object of this invention to provide means for carrying loads beneath helicopters in which said loads are stabilized to prevent oscillations which in many instances lead to serious control problems.

Another object of this device is to provide a stabilizing support on one side of a location where a load lifting or holding force is being applied.

A further object of this device is to provide an extension from an aircraft which will engage a load being handled by said aircraft to render said load stable.

Another object of this invention is to provide an extending member for stabilizing a load which is retractable.

A further object of this device is to provide adjustable means for easily accepting loads of varying widths.

Another object of this invention is to provide a device having controls easily operated by a pilot to achieve maximum handling efficiency.

A further object of this invention is to provide means for stabilizing external loads being supported at a single point.

These and other objects of this invention will become readily apparent from the following detailed description of the drawings:

Fig. 1 is a side view of a helicopter having a load suspended therefrom and stabilized by the invention, Fig. 2 is an enlarged view of the invention showing the controls and a portion of a load, Fig. 3 is a front view of the invention as shown in Fig. 2 showing a small portion of the helicopter with a load in place.

Referring to Fig. 1, a helicopter is shown having an extended fuselage 10, a single main sustaining rotor 12 and a torque compensating rotor 14 mounted on an upwardly extending pylon 16. Both rotors are driven by an engine mounted in the nose of the fuselage. A landing gear includes two main forward wheels 18. Each wheel is connected to the fuselage by a leg 19 through a bracket 112.

The load stabilizing means 20 is used in conjunction with a load holding means 22. The load holding means is of a type generally used for similar lifting tasks. It is comprised primarily of four main parts. They are the following: (1) cargo release hook means 24, (2) hook cable supporting means 26, (3) emergency pilot manual release means 28, and (4) normal pilot release control means 30.

The cargo release hook means 24 includes a housing 32 having a hook 34 extending from the bottom thereon being pivoted at 36 and having its hook end extending into the housing 32 where it is engaged by a holding mechanism. This hook 24 is maintained in place by two sets of cables 38 and 40, one set extending from each side of the fuselage of said helicopter 10. These cables are attached to the helicopter by brackets 42 and are attached to the housing 32 of the cargo release hook 24 by pivoted connector members 44.

An emergency release 28 is provided on the cargo release hook means 24 for the hook holding mechanism which is operated by a cable 46 connected to a pilot foot lever 48 by a bell crank 50. The holding mechanism is held in its holding position against release by the emergency manual control by a spring 52 which is positioned between a member 54 on the helicopter and a flange 56 on the foot lever 48. A section of the helicopter floor is shown at 57.

The cargo release hook means 24 is also provided with a normal release which is electrically operated and can release the hook holding mechanism in flight or on the ground by means of the electrical conduit 58 and electrical switch 60 which is in turn connected to an electrical source. Switch 60 can be located either on a panel or operating control stick of the helicopter.

Hook means 24 is also provided with a manually operable ground operating handle 62 for operating the hook holding mechanism from a position under the helicopter. An automatic release is also provided which will release the holding mechanism and discharge cargo from said hook means 24 upon contact of the cargo with the ground.

The load stabilizing means 20 is comprised primarily of four main parts. They are the following: (1) a cargo stabilizing arm 64, (2) arm supporting means 66, (3) arm actuating means 68, and (4) actuating control means 70.

The cargo stabilizing arm 64 (shown from the front in Fig. 3) comprises a main tubular member 72 supported for rotation in arm support means 66 in a manner to be hereinafter described. Tubular member 72 has a sleeve 74 fixed to each end thereof by means of pins 76 set at right angles to each other. Extending from each sleeve 74 at 90° to the axis of member 72 is a tubular arm member 78. Arm members 78 are parallel to each other and each is welded to its respective sleeve 74. For additional support a reinforcing strip 80 is attached to each sleeve 74 and the adjacent end of arm member 78.

On the free end of each tubular arm member 78, a sleeve 82 is affixed thereto in a manner similar to sleeve 74. Each sleeve 82 is welded to its respective arm 78 and a reinforcing strip is used to insure a rigid connection. A load bearing tubular member 84 extends between the free ends of tubular arm member 78 and has one of its free ends fixed in each of the sleeves 82, respectively. Each end of load bearing tubular member 84 is pinned in its respective sleeve 82 by pins 86. Reinforcing arm members 88 extend between each corner where a sleeve 74 meets its respective tubular arm member 78, to the center of the load bearing tubular member 84. A bracket 90 is provided at each connection of sleeve 74 to arm 78 and a bracket 92 is provided at the center of member 84.

Slidably mounted on load bearing tubular member 84 are two sleeves 94 each with a load guiding and positioning projection 96 extending therefrom. A set screw 98 is provided in each sleeve 94 to fixedly position it on load bearing tubular member 84. It can be seen that these projections can be slidably moved between a center position to a position where the sleeves 94 abut their respective end sleeves 82.

Arm supporting means 66 are provided for rotatably supporting the cargo stabilizing arm 64. Supporting means 66 comprises two bearing sleeves 100 positioned around tubular member 72, one at each end adjacent a sleeve 74. Each sleeve 100 is fixed to the helicopter structure by a link 102 and a link 104. One end of each link 102 and 104 is fixed to a bracket 106 on its respective sleeve 100. The other end of each arm 102 is pinned to a bifurcated bracket 108 fixed to the bottom of the ship and the other end of arm 104 is pinned to a bifurcated bracket 110 fixed to the bottom of the main landing gear leg pivot bracket 112. The axes of these mounting pins are located at 90° to each other.

Each bearing sleeve 100 is additionally supported in place by two cables 114 and 116 extending from the side of the fuselage of said helicopter 10, on which the bearing sleeve is located, to a rib located on the sleeve 100. Each cable 114 is attached to the helicopter by a bracket 118 and is attached at its other end to a rib on its cooperating sleeve 100. Each cable 116 is attached to the helicopter by a bracket 120 and is attached at its other end to a rib on its cooperating sleeve 100.

Arm 64 is rotatable between a position extending downwardly, as shown in solid lines in Fig. 2, and a retracted position extending rearwardly, as shown in dotted lines in the same Fig. 2. The arm actuating means 68 comprises a bifurcated lever 122 which extends from the tubular member 72 and is fixed thereto through a sleeve member 124. The lever 122 is fixed to the sleeve 124 which is in turn fixed to the tubular member 72. The free end of lever 122 is attached to one end of a linear actuator 125 at 126 by a pinned connection. The other end of the linear actuator is connected to a bifurcated bracket 128 on the helicopter by a pinned connection at 130. Linear actuator 125 is moved between its extended and retracted position by an electric motor 132. This motor 132 can be operated by the pilot through control means including electrical conduit 134 and electrical switch 136 which is in turn connected to an electrical source. While a linear actuator has been shown which is electrically operated, it is to be understood that other actuators can be used, such as hydraulic piston and cylinder units.

Operation

When it is desired to carry a load by a helicopter in which stabilization is desired, a rope, chain or cable 140 can be fixedly attached to the device to be loaded, such as a pole shown in the figures, at a point spaced from the center of gravity of the load. This cable or attaching means can then be connected to the cargo release hook means 24 through the use of the hook 34 using the manually operable ground operating handle 62. The helicopter can then be flown in a vertical direction upwardly until there is sufficient room for the cargo stabilizing arm to be positioned in its extended position. When this altitude has been reached, the pilot merely operates his electrical switch 136 to actuate the linear actuator 125. The projections 96 are positioned on each side of the load to prevent a swinging motion about its supporting point. The load may now be flown to any desired point without fear of any unwanted control problems due to load changes and movements. The load may now be disposed of by any of the ways provided. That is, the pilot may find it necessary to depress his emergency release foot lever 48 to release the hook 34 and thereby drop the load. However, in normal release the pilot may operate his electrical switch to release the hook 34 or he may set an automatic release so that the cargo will be discharged from the hook means upon contact of the cargo with the ground. A fourth means of releasing the load is to lower the helicopter to a position which will make the hook means 34 accessible to a person below the ship so that the ground operating handle 62 is available for releasing the hook 34.

A load may also be picked up by flying the helicopter downwardly over the load with the cargo stabilizing arm in its extended position and positioning it over the load. The load can then be connected to the cargo hook release means and the stabilizing arm can be placed in its proper position. The helicopter then is merely flown upwardly. Release of the load may be carried out by any of the means set forth above.

It is to be understood that the invention is not limited to the specific embodiment herein illustrated and described, but may be used in other ways without departure from its spirit as defined by the following claims.

I claim:

1. In combination, a helicopter; a load; first load supporting means extending from said helicopter; said first means pivotally supporting said load at a location spaced from the center of gravity of said load; second load stabilizing means comprising an arm extending downwardly from said helicopter engaging said load at a second point spaced from the first point; said arm having a first member rotatably mounted on said helicopter, arm means extending at an angle from said first member, and a second load contacting member fixed to the arm means and spaced from said first member.

2. In combination, a helicopter; means connected to said helicopter for pivotally supporting a load; load stabilizing means for engaging a load comprising an arm extending downwardly from said helicopter; said arm having a first member rotatably mounted on said helicopter, arm means extending at an angle from said first member, and a second load bearing member fixed to the arm means and spaced from said first member; means for moving said arm on said rotatable member between an extended and retracted position; said last named means including a lever extending from said first member; and actuating means fixed to the free end of said lever and said helicopter for rotating said first member.

3. In combination, a helicopter; means connected to said helicopter for pivotally supporting a load; load stabilizing means for engaging a load comprising an arm extending downwardly from said helicopter; said arm having a first member rotatably mounted on said helicopter, arm means extending at an angle from said first member, and a second load bearing member fixed to the arm means and spaced from said first member; means for moving said arm on said rotatable member between an extended and retracted position; said last named means including a lever extending from said first member; and actuating means for rotating said first member; said actuating means comprising a linear actuator having one end attached to the free end of said lever and the other end attached to the helicopter.

4. In combination, a helicopter; means connected to said helicopter for pivotally supporting a load; load stabilizing means for engaging a load comprising arm means extending downwardly from said helicopter; said arm means having a first member; said first member having a section with a cylindrical surface at each end; a sleeve positioned around each cylindrical surface; said member being rotatably mounted in said sleeves; said sleeves being mounted below said helicopter; said arm means having arms extending at an angle from said first member; a second load bearing member fixed to the arms and spaced from said first member; and means for moving said arm means on said rotatable member between an extended and retracted position.

5. In combination, a helicopter; means connected to said helicopter for pivotally supporting a load; load stabilizing means for engaging a load comprising arm means extending downwardly from said helicopter; said arm means having a first member; said first member having a section with a cylindrical surface at each end; a sleeve positioned around each cylindrical surface; said member being rotatably mounted in said sleeves; said sleeves being mounted below said helicopter; said arm means having arms extending at an angle from said first member; a second load bearing member fixed to the arms and spaced from said first member; means for moving said arm means on said rotatable member between an extended and retracted position, said last named means including a lever extending from said first member; and actuating means fixed to the free end of said lever and said helicopter for rotating said member.

6. In combination, a helicopter; means connected to said helicopter for pivotally supporting a load; load stabilizing means for engaging a load comprising arm means extending downwardly from said helicopter; said arm means having a first member; said first member having a section with a cylindrical surface at each end; a sleeve positioned around each cylindrical surface; said member being rotatably mounted in said sleeves; said sleeves being mounted below said helicopter; said arm means having arms extending at an angle from said first member; a second load bearing member fixed to the arms and spaced from said first member; means for moving said arm means on said rotatable member between an extended and retracted position, said last named means including a lever extending from said first member, and actuating means for rotating said first member, said actuating means comprising a linear actuator having one end attached to the free end of said lever and the other end attached to the helicopter.

7. In combination, a helicopter; means connected to said helicopter for pivotally supporting a load; load stabilizing means for engaging a load comprising an arm extending downwardly from said helicopter; said arm having a first member rotatably mounted on said helicopter, arm means extending at an angle from said first member, and a second load positioning member fixed to the arm means and spaced from said first member; said second load positioning member having two projections for engaging the sides of a load; means for moving said arm on said rotatable member between an extended and retracted position; said last named means including a lever extending from said first member; and actuating means fixed to the free end of said lever for rotating said first member.

8. In combination, a helicopter; means connected to said helicopter for pivotally supporting a load; load stabilizing means for engaging a load comprising an arm extending downwardly from said helicopter; said arm having a first member rotatably mounted on said helicopter, arm means extending at an angle from said first member, and a second load positioning member fixed to the arm means and spaced from said first member; said second load positioning member having two projections for engaging the sides of a load; means for moving said arm on said rotatable member between an extended and retracted position; said last named means including a lever extending from said first member; and actuating means fixed to the free end of said lever for rotating said first member, said actuating means comprising a linear actuator having one end attached to the free end of said lever and the other end attached to the helicopter.

9. In combination, a helicopter; means connected to said helicopter for pivotally supporting a load; load stabilizing means for engaging a load comprising an arm extending downwardly from said helicopter; said arm having a first member rotatably mounted on said helicopter, arm means extending at an angle from said first member, and a second load positioning member fixed to the arm means and spaced from said first member; said second load positioning member having two projections for engaging the sides of a load; said projections being adjustable in position along said second load positioning member, means for moving said arm on said rotatable member between an extended and retracted position; said last named means including a lever extending from said first member; and actuating means fixed to the free end of said lever for rotating said first member.

References Cited in the file of this patent

UNITED STATES PATENTS

| | | |
|---|---|---|
| 2,613,831 | Rees | Oct. 14, 1952 |
| 2,780,422 | Maglio | Feb. 5, 1957 |
| 2,797,881 | Andrews | July 2, 1957 |
| 2,843,337 | Bennett | July 15, 1958 |
| 2,903,146 | Meloy | Sept. 8, 1959 |